(12) United States Patent
Karino (10) Patent No.: US 8,599,883 B2
(45) Date of Patent: Dec. 3, 2013

(54) TRANSIT TIME FIXATION DEVICE

(75) Inventor: Tatsuya Karino, Hiki-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 336 days.

(21) Appl. No.: 13/061,346

(22) PCT Filed: Aug. 28, 2009

(86) PCT No.: PCT/JP2009/004243
§ 371 (c)(1),
(2), (4) Date: Feb. 28, 2011

(87) PCT Pub. No.: WO2010/023955
PCT Pub. Date: Mar. 4, 2010

(65) Prior Publication Data
US 2011/0158263 A1    Jun. 30, 2011

(30) Foreign Application Priority Data
Aug. 28, 2008  (JP) ................................ 2008-220315

(51) Int. Cl.
*H04J 3/06*    (2006.01)
*G08B 21/00*   (2006.01)

(52) U.S. Cl.
USPC ........................................ 370/503; 340/644

(58) Field of Classification Search
USPC ............... 370/503; 439/620.01, 783; 340/664
See application file for complete search history.

(56) References Cited

U.S. PATENT DOCUMENTS

| | | | |
|---|---|---|---|
| 5,910,955 A | 6/1999 | Nishimura et al. | |
| 7,818,389 B1 * | 10/2010 | Chiang et al. | 709/212 |
| 8,208,815 B1 * | 6/2012 | Chiang et al. | 398/155 |
| 8,406,633 B1 * | 3/2013 | Johnston et al. | 398/154 |
| 2003/0112758 A1 * | 6/2003 | Pang et al. | 370/235 |
| 2005/0036254 A1 | 2/2005 | Premerlani et al. | |
| 2008/0309505 A1 * | 12/2008 | Sorimachi et al. | 340/664 |
| 2009/0316580 A1 * | 12/2009 | Pang et al. | 370/235 |

FOREIGN PATENT DOCUMENTS

| | | |
|---|---|---|
| EP | 0 135 110 A2 | 3/1985 |
| JP | 10 262075 | 9/1998 |
| JP | 2000 332809 | 11/2000 |
| JP | 2000 358069 | 12/2000 |
| JP | 2001-156857 | 6/2001 |
| JP | 2001 177570 | 6/2001 |

OTHER PUBLICATIONS

International Search Report Issued Oct. 27, 2009 in PCT/JP09/004243 filed Aug. 28, 2009.

(Continued)

*Primary Examiner* — Asad Nawaz
*Assistant Examiner* — Nicholas Jensen
(74) *Attorney, Agent, or Firm* — Oblon, Spivak, McClelland, Maier & Neustadt, L.L.P.

(57) ABSTRACT

A transit time fixation device and a control method of the same is provided which can constantly fix transmission delay time in relation to synchronous frames, and allows a high accuracy sampling synchronization control. The frame 101 from a client 3C1 is input to a transit time fixation device 2 via a port 21P1. A frame type judgment part 25*a* in a control circuit 25 judges the frame type of the frame 101 transmitted from the client 3C1. A destination judgment part 25*b* acquires a destination address from the received frame 101 to specify a frame control circuit 24Cn+1 to perform a delay process. The frame 101 judged a synchronous frame is delayed at a specific time by a specific time delay part 26*a* in the specified frame control circuit 24Cn+1.

4 Claims, 11 Drawing Sheets

FOURTH TIME CHART (56) References Cited

OTHER PUBLICATIONS

Supplementary European Search Report issued Sep. 16, 2013, in PCT/JP2009/004243, filed Aug. 28, 2009.

Y. Serizawa, et al., "ATM Transmissions of Microprocessor-Based Current Differential Teleprotection Signals", IEEE Transactions on Power Delivery, IEEE Service Center, New York, NY, US, vol. 14, No. 2, Apr. 1, 1999, pp. 335-341.

* cited by examiner

FRAME FORMAT

TRANSIT TIME FIXATION DEVICE

FIELD

This invention relates to data transmission and reception and sampling synchronization control in a current differential relay for protecting a power transmission line, and in particular relates to a technique for allowing the fixation of transmission delay time in relation to synchronous frames.

BACKGROUND

Recently, in current differential relays, data transmission and reception and sampling synchronization control are made in general using dedicated communication equipment for relay, in which there are small fluctuations in transmission delay time, and in future, it is desired to develop a protective relay which can provide a high accuracy sampling synchronization control with use of a network such as Ethernet (registered trademark, which is omitted below).

In conventional protective relays, so as to provide a high accuracy sampling synchronization control, a digital current differential relay is adopted which has the following configuration (See Non-Patent Document 1). The digital current differential relay, as shown in FIG. 9, using two terminals of a power transmission line as a master station and a slave station, measures time intervals ($T_M$ and $T_S$) between a sampling time point of its own terminal and a received time point when receiving a timing flag (TF) which is a data about sampling timing from the other station, and calculates a sampling synchronization error ($\Delta T$) from the time intervals $T_M$ and $T_S$.

In other words, in the relay, the master station and the slave station each transmit the $T_M$ or $T_S$ to the other station, and adjust the sampling timing based on the sampling synchronization error $\Delta T$. Note that the transmission format used in the relay has frames with a fixed length, and transmits at fixed intervals in relation to a sampling reference signal.

Figure 9:
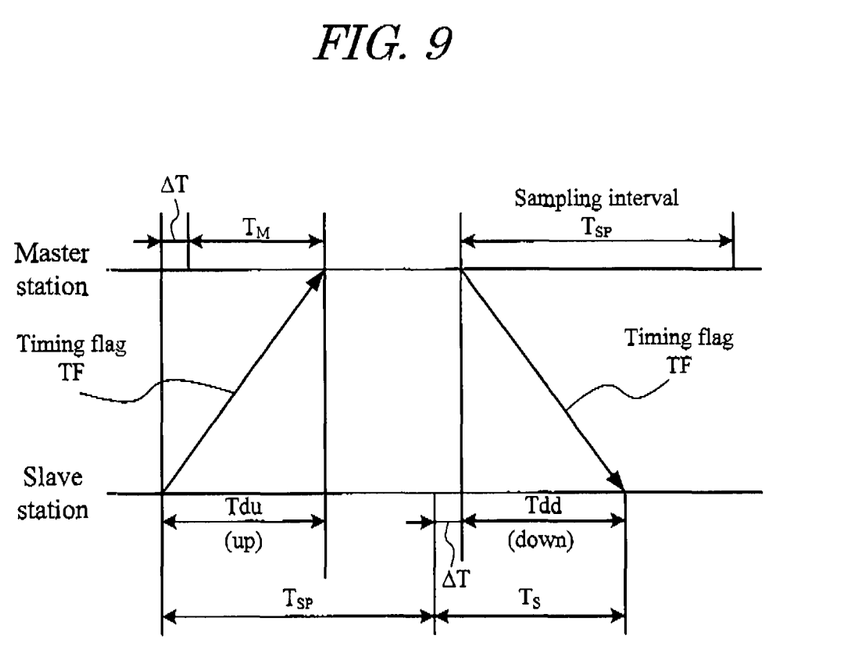
FIG. 9 is a view illustrating a sampling synchronization of a digital current differential relay according to a conventional technique.

Note that such a method of sampling synchronization control requires that the transmission delay time of an up transmission and a down transmission is equal between the two opposite terminals as shown in FIG. 9, that is, the up transmission delay time $T_{du}$ of the timing flag TF from the slave station to the master station and the down transmission delay time $T_{dd}$ of the timing flag TF from the master station to the slave station are equal to each other.

In addition, so as to provide a high accuracy time synchronization, another method of sampling synchronization control method is also proposed in which the following restriction is used (See Patent Document 1). With the method, a switching hub is adopted, in which the length of a frame to be transmitted is fixed, and the length is limited to a specific value or less, and further, a priority transmission function is provided for repeat a synchronous frame in a preferential manner.

Non-Patent Document 1: "Protective relay system engineering" the Institute of Electrical Engineers of Japan, 2002

Patent Document 1: Japanese Patent Application Laid-open No. 2000-332809

As mentioned above, the method of sampling synchronization control, in which the master station and the slave station each transmit the $T_M$ or $T_S$ to the other station, and adjust the sampling timing based on the sampling synchronization error $\Delta T$, requires that the up transmission delay time $T_{du}$ and the down transmission delay time $T_{dd}$ of the timing flag TF are equal to each other.

However, when using a network such as Ethernet, it is difficult to make equal the up transmission delay time $T_{du}$ and the down transmission delay time $T_{dd}$. The reasons for this include that a plurality of repeaters are generally provided in a network, and a delay occurs when a frame passes through one of the repeaters.

In addition, the delay time varies depending on network load conditions, and further, the delay time varies depending on the order of frame processing within the repeater in the network. Therefore, it is difficult to make the delay time definite when a frame passes through the repeater in the network, and the transmission delay time is not equal between the two ways which allows two-way transmission between the master station and the slave station, as a result, a high accuracy sampling synchronization control can not be provided.

Figure 10:
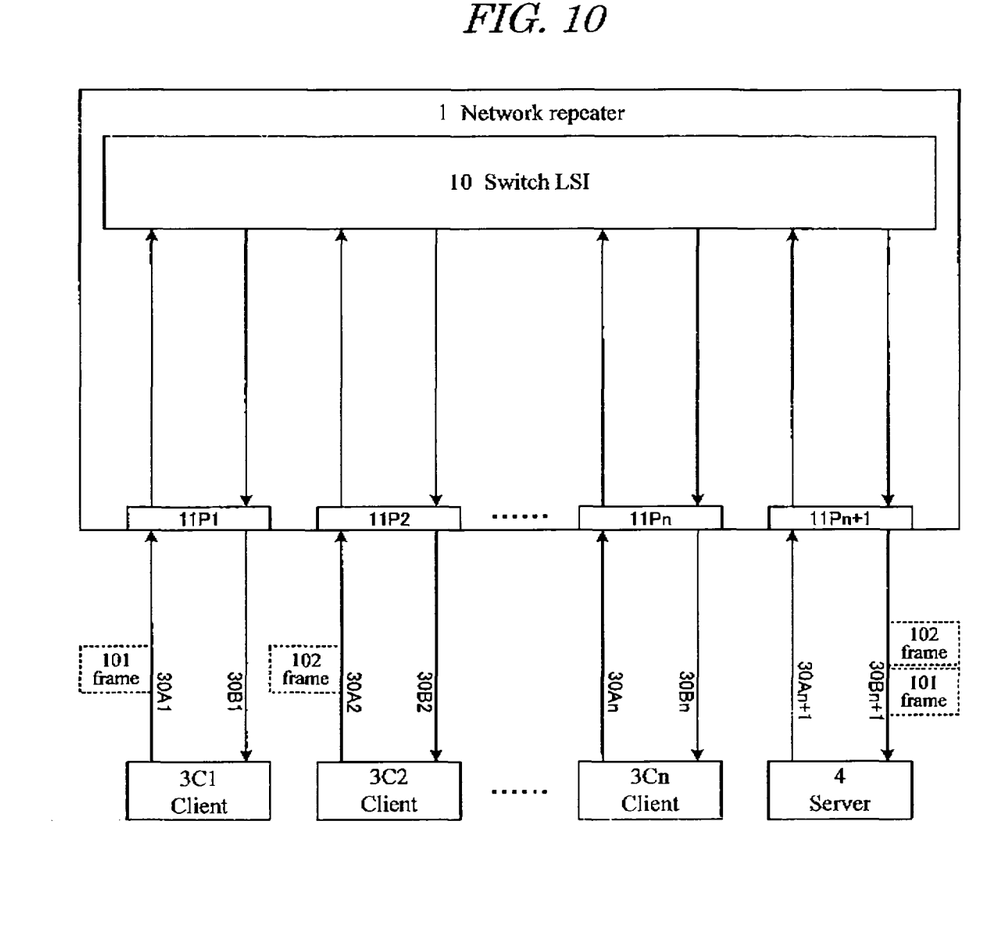
FIG. 10 is a block diagram showing an example of the entire configuration according to a conventional technique.

Here, the matter of that the transmission delay time is not equal between the two ways in a network repeater when a network is used, will be explained in more detail referring to FIG. 10. FIG. 10 shows a configuration in which a network repeater 1 such as an Ethernet switch is connected with n clients 3C1 to 3Cn and a server 4.

With the configuration as shown in FIG. 10, the frame transmission delay time of the client 3C1 and client 3C2 via the network repeater 1, can be calculated as follows.

Figure 11:
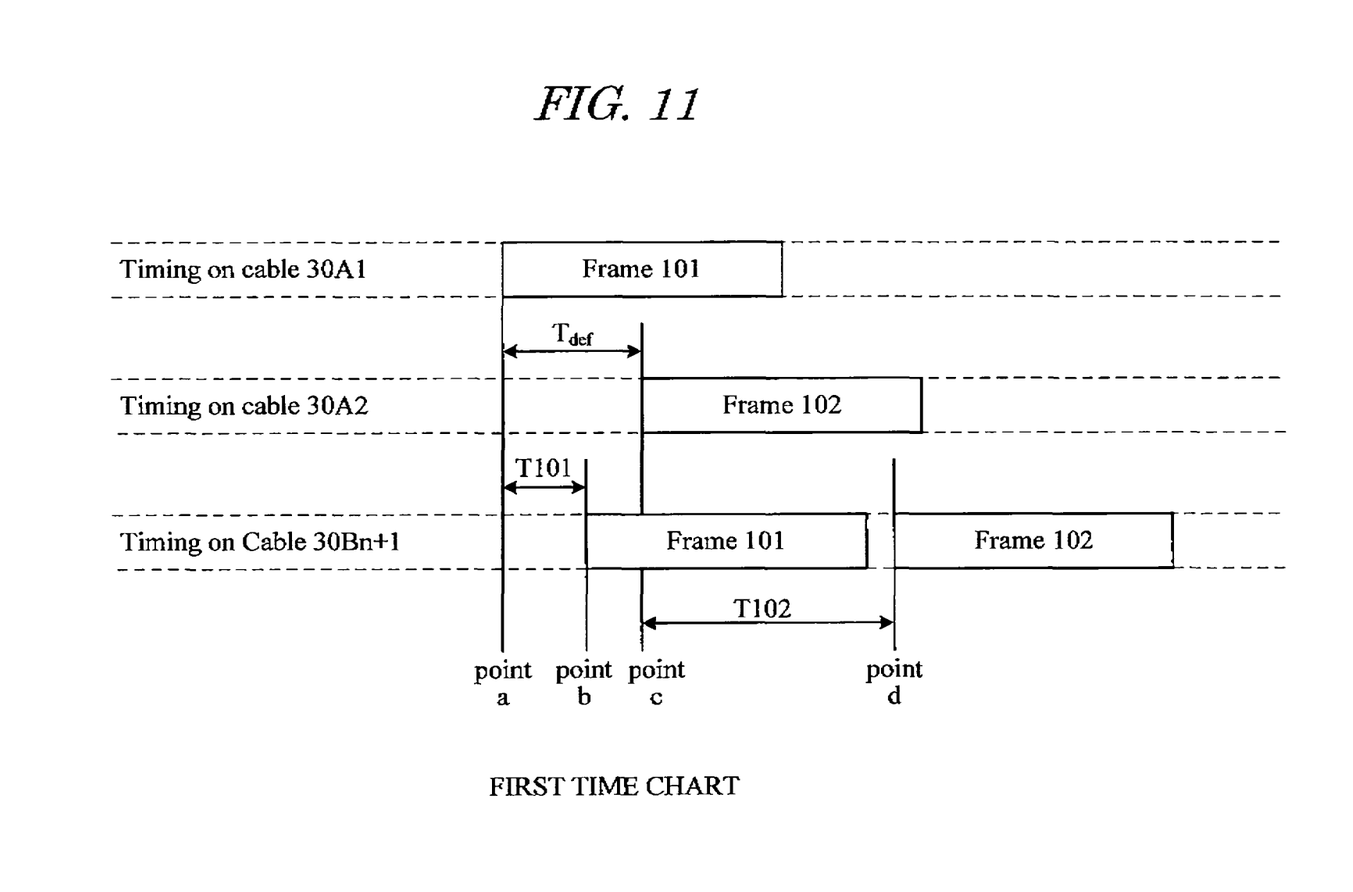
FIG. 11 is a view showing a first time chart of frame transmission timing on a cable according to conventional technique.

First, the client 3C1 transmits on a cable 30A1 a frame 101 addressed to the server 4, and just after this, the client 3C2 transmits on a cable 30A2 a frame 102 addressed to the server 4. FIG. 11 is a first time chart that shows frame transmission timing on the cable in this situation.

The frame 101 and the frame 102 arrive at the network repeater 1 at an interval of the time difference $T_{def}$ shown in the first time chart, and then the frame 101 is output from the network repeater 1 on a cable 30Bn+1 after a delay of T101. On the other hand, since the frame 101 is outputting, the frame 102 waits for completion of output of the frame 101, and is output from the network repeater 1 on a cable 30Bn+1 after the waiting time T102 has passed, as shown in FIG. 11.

In other words, as shown in the first time chart of FIG. 11, the time T101 in which the frame 101 passes through the network repeater 1 and time T102 in which the frame 102 passes through the network repeater 1 are not equal to each other. As a result, it is difficult to allow the transmission delay time of the frames to be a definite period of time, and the transmission delay time is not equal between the two ways of up and down transmission between the two terminals.

Here, T102 as a transit time in which the frame 102 passes through the network repeater 1, is determined depending on the transmission rate and the frame length of the frame 101. Therefore, if the transmission rate is 100 Mbps and the frame length of the frame 101 is 12,320 bits that is a maximum length under frame standards, then T102 is about 123 μs. On the other hand, T101 as a transit time in which the frame 101 passes through the network repeater 1, is determined depending on the delay time of hardware within the network repeater 1, which is usually several hundreds of ns.

As mentioned above, the delay time in which the delay time in which a frame passes through the network repeater 1 such as an Ethernet switch varies from several hundreds of ns of T101 to 123 μs of T102, it is difficult to fix the delay time.

In addition, the method of using a switching hub, in which the length of a frame is fixed, and the length is limited to a specific value or less, and further, a priority transmission function is provided for repeat a synchronous frame in a preferential manner, can allow fluctuations in transmission delay time to be smaller, but as a result of limiting the length of a frame to a specific value or less, the extensibility of the frame is sacrificed. Further, even if the length of a frame is limited to a specific value or less, fluctuations in transmission delay time occur depending on the frame length.

This invention has been devised so as to solve the problems mentioned above, and has as an object the provision of a transit time fixation device and a control method of the same, which can constantly fix transmission delay time in relation to synchronous frames, and allows a high accuracy sampling synchronization control.

SUMMARY

In order to attain the above object, as one aspect of this invention, a transit time fixation device is provided, which is used for protecting a power transmission line by a protective relay provided at each of a plurality terminals of the power transmission line, based on information about electric current from each terminal, and makes a sampling synchronization between the terminals via a network to control transmission delay time between the terminals. The transit time fixation device has a frame type judgment part which judges as to whether a frame is synchronous frame in the relation between a transmitter terminal and a destination terminal, wherein the frame has been transmitted from each terminal and is composed of various information including information about electric current of the transmitter terminal; and a specific time delay part which performs a delay process of adding a specific time delay to transmission time in which a synchronous frame judged by the frame type judgment part is transmitted to the destination terminal.

As another aspect of this invention, the transit time fixation device further has: a plurality of the specific time delay parts each of which is provided for each of the terminals; information about destination address, which is included in the frame, for identifying the transmitter terminal; and a destination judgment part which judges the destination terminal for each frame based on the information about destination address and identifies one of the specific time delay parts depending on the destination terminal.

As another aspect of this invention, the transit time fixation device further has: a delay frame judgment part which judges as to whether there is a synchronous frame to which a delay process is in progress by the specific time delay part; and a general frame delay part which adds a delay to a general frame that has been judged not a synchronous frame by the frame type judgment part when the delay frame judgment part has judged that there is a synchronous frame to which a delay process is in progress.

With this invention mentioned above, since it is possible to add a specific time delay to transmission of a synchronous frame, when the specific time is appropriately set depending on the transmission rate or the frame length, this allows each transmission time of a plurality of synchronous frames from a plurality of terminals, which is a time period up to the time point at which each frame arrives at the destination terminal, to be fixed equally. Consequently, when the network repeater makes a process of a plurality of frames from a plurality of terminals, the transmission delay time difference between the two ways does not occur among the plurality of synchronous frames, as a result, a high accuracy sampling synchronization control can be provided. In addition, although the conventional methods require that the frame length is limited to a specific value or less so as to allow dispersion of delay time in a network repeater to be minimized, this invention does not require such a limitation of the frame length, as a result, a large quantity of information can be transmitted.

EXPLANATION OF REFERENCE NUMERALS

1 . . . network repeater
2 . . . transit time fixation device
3C . . . client
4 . . . server
11P, 21P, 22P . . . port
20A, 20B . . . signal line
23 . . . judgment circuit
24C . . . frame control circuit
25 . . . control circuit
25a . . . frame type judgment part
25b . . . destination judgment part
26 . . . FIFO circuit
26a . . . specific time delay part
26b . . . delay frame judgment part
26c . . . general frame delay part
30A, 30B . . . cable
101 . . . frame (synchronous frame)
102 . . . frame (general frame)

DETAILED DESCRIPTION

Configuration of Embodiment

{Entire Configuration}

Below, a configuration according to an embodiment will be explained referring to FIG. 1. Note that symbols "1" to "n+1" added to the end part of a reference numerals are used only when individual elements should be distinguished. Therefore, in terms of simplification, when it is unnecessary to distinguish individual elements, or when showing a plurality of identical elements generally or collectively, these end symbols will be omitted below.

Figure 1:
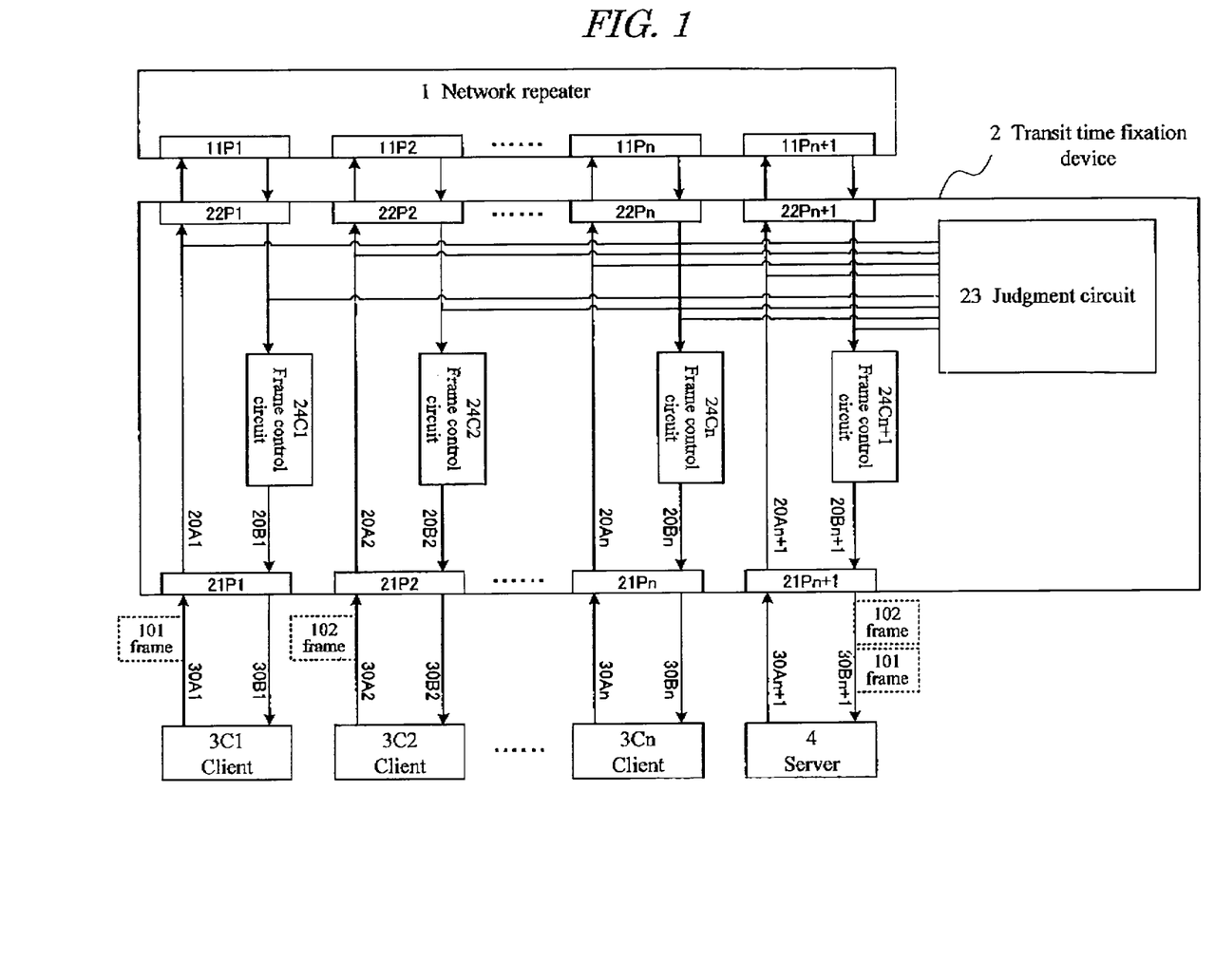
FIG. 1 is a block diagram showing an example of the entire configuration according to an embodiment of this invention.

As shown in FIG. 1, in an entire configuration, a network repeater 1 such as an Ethernet switch is connected with n clients 3C1 to 3Cn and a server 4 via a transit time fixation device 2 which is an important element according to this invention. Here, the clients 3C1 to 3Cn and the server 4, are implemented in a general system such as a current differential relay with network interface hardware The network repeater 1 is a general purpose switching hub, which is used as a repeater in a network, analyzes data transmitted from the clients 3C1 to 3Cn and the server 4 to detect a destination (destination of transmission), and then transmits the data to the destination among the clients 3C1 to 3Cn and the server 4.

In addition the network repeater 1 has a plurality (n+1) of ports 11P1 to 11Pn+1 which is used for individually interfacing with the clients 3C1 to 3Cn and the server 4. As a result, the network repeater 1 has a function that sends out a frame to a specific port depending on its destination in accordance with a destination address included in the frame that has been transmitted from the clients 3C1 to 3Cn and the server 4. Note that the ports 11P1 to 11Pn+1 of the network repeater 1 are implemented in a physical layer such as an Ethernet physical layer (PHY).

{Configuration of Transit Time Fixation Device}

Next a specific configuration of the transit time fixation device 2, which fixes transit time of frames from the clients 3C1 to 3Cn and the server 4, will be explained in detail.

As shown in FIG. 1, the transit time fixation device 2 has signal lines 20A1 to 20A1+1 and 20B1 to 20B1+1 for two ways, ports 21P1 to 21Pn+1 for individually interfacing with the clients 3C1 to 3Cn and the server 4, and ports 21P1 to 21Pn+1 for individually interfacing with the network repeater 1. Here, each pair of signal lines 20A and 20B for two ways which have an identical end symbol (1 to n+1), are connected between a pair of ports 21P and 22P which have the same end symbol (1 to n+1) as the signal line pair.

In addition, among the ports 21P1 to 21Pn+1, ports 21P1 to 21Pn each are individually connected with each of the clients 3C1 to 3Cn which has the same end symbol as the port, via a pair of the cables 30A1 to 30An and 30B1 to 30Bn for two ways which have the same end symbol as the port. Further, the port 21Pn+1 is connected with the server 4 via a pair of the cables 30An+1 and 30Bn+1 for two ways which have the same end symbol as the port.

The transit time fixation device 2 has as important elements according to this invention, a judgment circuit 23 which monitors the signal lines 20A and 20B to detect a synchronous frame, a frame control circuits 24C1 to 24Cn+1 which adds a specific time (fixed time) delay to a synchronous frame detected by the judgment circuit 23 and then transmits the synchronous frame from the ports 21P1 to 21Pn+1 to the clients 3C1 to 3Cn and the server 4.

Figure 2:
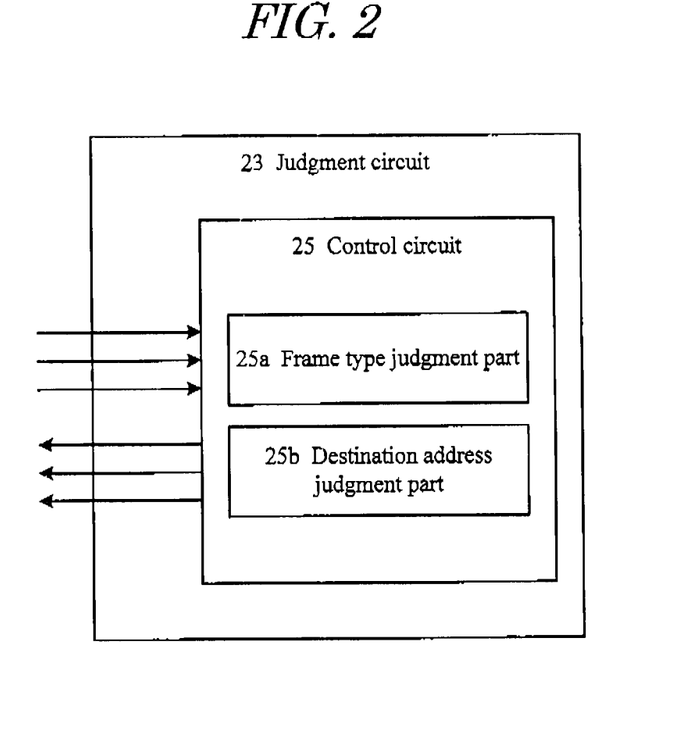
FIG. 2 is a block diagram showing a specific configuration example of a judgment circuit in a transit time fixation device according to an embodiment of this invention.

Here, the judgment circuit 23 monitors the signal lines 20A1 to 20A1+1 and 20B1 to 20B1+1 for two ways to detect a synchronous frame transmitted from the network repeater 1, the clients 3C1 to 3Cn and the server 4, and has a control circuit 25 as shown in FIG. 2. The control circuit 25 has a frame type judgment part 25a which judges the frame type of a transmitted frame, and a destination judgment part 25b which judges the destination based on a destination address included in the frame, specifies one of the frame control circuits 24C depending on the destination, and outputs a delay command or a transit command depending on the frame type to the specified frame control circuit 24C. In other words, the judgment circuit 23, when the frame type judgment part 25a has judged a synchronous frame, transmits a delay command to the frame control circuit 24C specified by the destination judgment part 25b, and when judged a general frame other than synchronous frame, transmits a transit command to the specified frame control circuit 24C.

Figure 3:
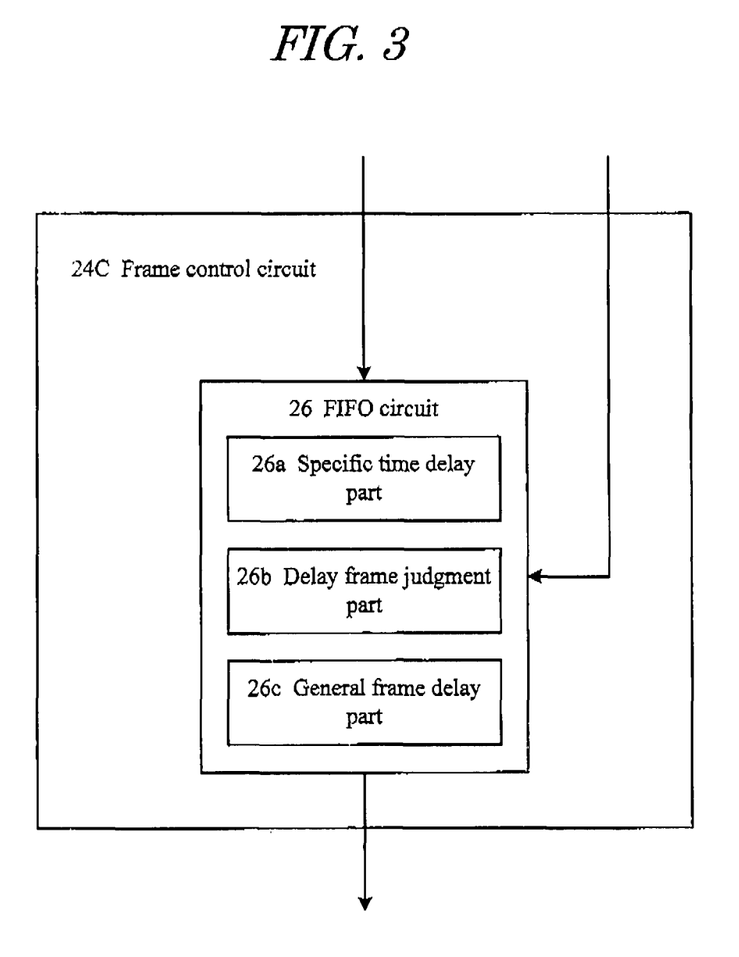
FIG. 3 is a block diagram showing a configuration example of a frame control circuit according to an embodiment of this invention.

In addition, the frame control circuits 24C1 to 24Cn+1, which are respectively inserted in the middle of the signal lines 20B1 to 20Bn+1, inputs a frame passing through the signal lines 20B1 to 20Bn+1 and a command from the judgment circuit 23. These frame control circuits 24C1 to 24Cn+1 individually corresponds to the ports 21P1 to 21Pn+1 and the ports 22P1 to 22Pn+1, and also individually corresponds to the clients 3C1 to 3Cn and the server 4 connected with the ports 21P1 to 21Pn+1. Further, the individual frame control circuit 24C has a FIFO circuit 26 including FIFO buffer memory, as shown in FIG. 3. The FIFO circuit 26 has a specific time delay part 26a making use of the FIFO buffer memory, a delay frame judgment part 26b, and a general frame delay part 26c.

Here, the specific time delay part 26a, when the judgment circuit 23 has sent a delay command, stores a synchronous frame to be delayed in the FIFO buffer memory during a specific time as a delay process which adds the specific time delay to the synchronous frame. In addition, the delay frame judgment part 26b judges as to whether there is a synchronous frame to which a delay process is in progress depending on whether there is a frame stored in the FIFO buffer memory. Further, the general frame delay part 26c, when the delay frame judgment part 26b has judged that there is a synchronous frame to which a delay process is in progress, stores a general frame other than synchronous frame in the FIFO buffer memory to delay and wait for until the delay process of the synchronous frame is completed.

{Actions of Embodiment}

Figure 4:
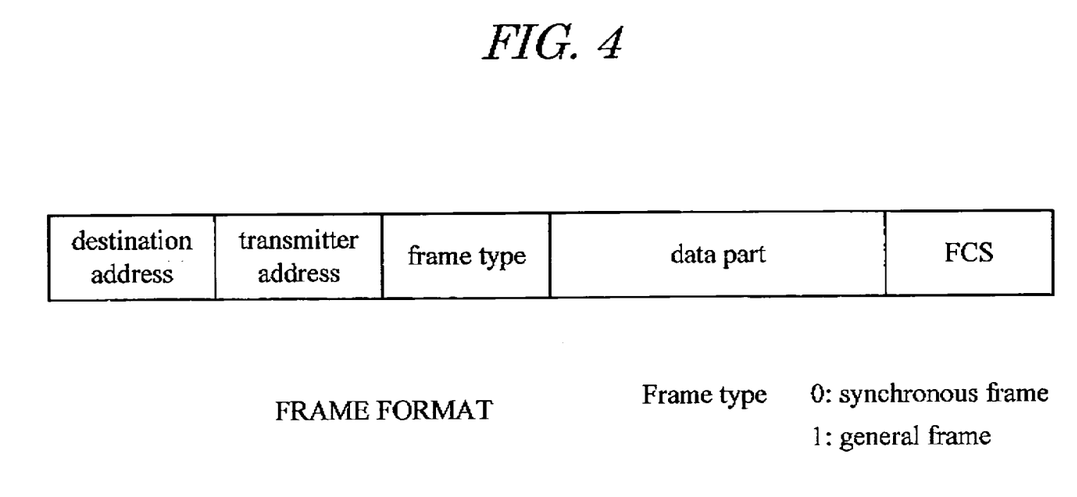
FIG. 4 is a view showing a configuration example of a frame used in this invention.

Next, examples of the transit time fixation device 2 mentioned above according to this embodiment will be explained. Note that in this embodiment, a frame such as the frame 101 or frame 102 transmitted from the client 3C and server 4, for example as shown in FIG. 4, is configured in a format that includes destination address, transmitter address, frame type, data part, and FCS (check code). Here, as an example, a value given for denoting a frame type is either of a value "0" that denotes a synchronous frame and a value "1" that denotes a general frame other than synchronous frame.

In the transit time fixation device 2 according to this embodiment, basically, a synchronous frame and a general frame other than synchronous frame are distinguished based on the frame type of the frame format. When the frame type is synchronous frame, the judgment circuit 23 outputs a delay command to allow the frame control circuit 24C to perform a delay process that fixes the delay time of the synchronous frame to a specific time. On the other hand, when the frame type is general frame other than synchronous frame, the judgment circuit 23 outputs a transit command to allow the frame control circuit 24C not to perform a delay process, as a result, the general frame basically and only passes through the transit time fixation device 2. Note that, exceptionally, when a general frame has arrived at the transit time fixation device 2 during the delay process of a synchronous frame, the general frame is allowed to wait for until the delay process of the synchronous frame is completed. A plurality of operation examples will be explained successively below.

First Operation Example

Case of a Synchronous Frame Alone

Below, a first operation example of the transit time fixation device 2 according to this embodiment will be explained referring to a second time chart shown in FIG. 5. Note that in the first operation example, an operation sequence performed when frames to be transmitted include no general frame and a synchronous frame 101 is transmitted alone, will be explained.

Figure 5:
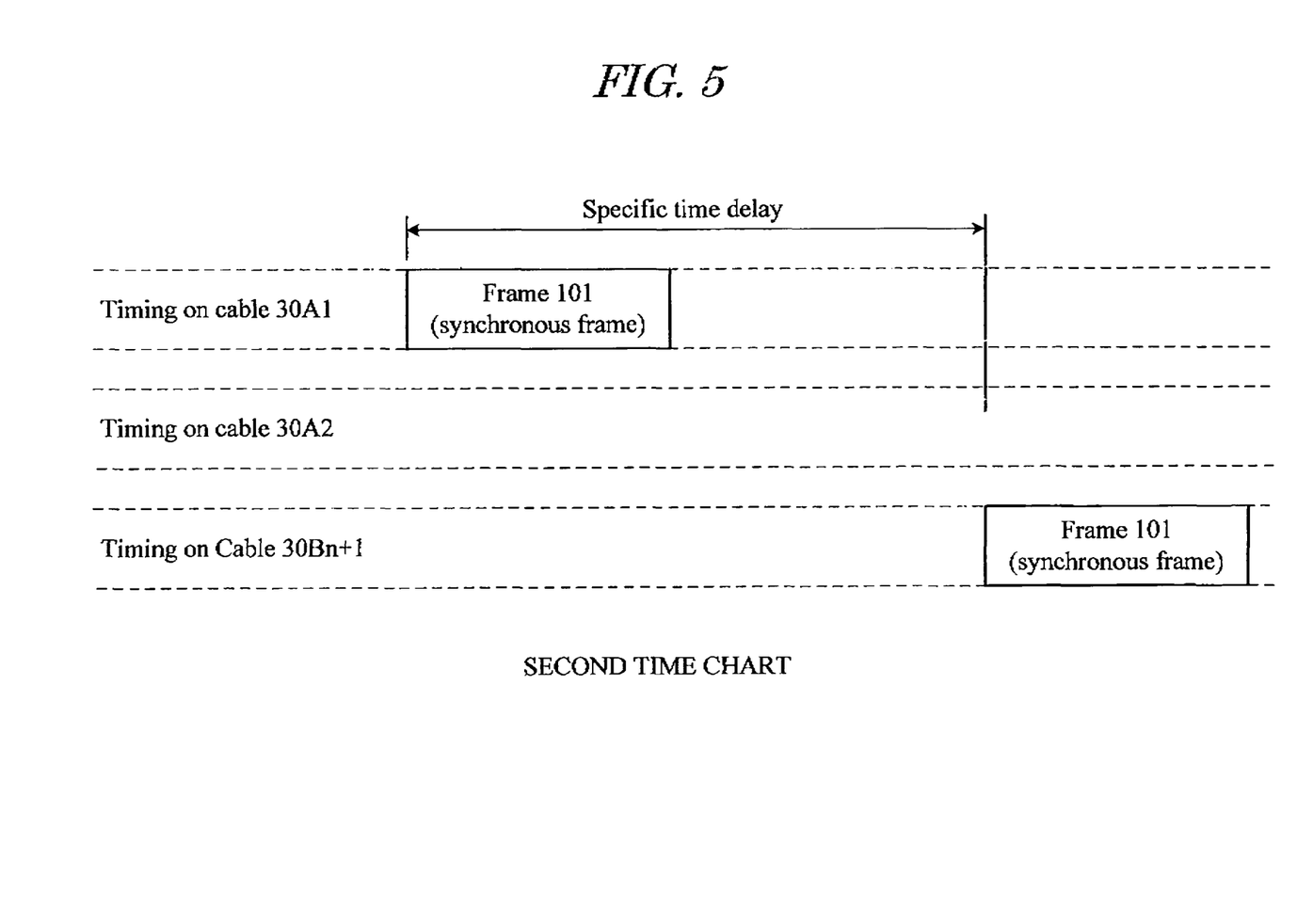
FIG. 5 is a view showing a second time chart of frame transmission timing on a cable according to an embodiment of this invention.

First, the frame 101, which has been transmitted from the client 301 to the cable 30A1 in the timing of the second time chart shown in FIG. 5, is input to the transit time fixation device 2 via the port 21P1.

Next, in the judgment circuit 23 provided in the transit time fixation device 2, the frame type judgment part 25a in the control circuit 25 judges the frame type of the frame 101 transmitted from the client 3C1. In other words, a judgment is made as to whether the frame type in such a frame as shown in FIG. 4 is "0" or not. Here, when a judgment has been made that the frame type of the frame 101 is "0", that is, the frame 101 is a synchronous frame, the frame type judgment part 25a transmits a specific time delay command of the synchronous frame 101 to the frame control circuit 24Cn+1 corresponding to the destination server 4.

In this case, the destination judgment part 25b in the control circuit 25 acquires a destination address from the received frame 101 to judge that the destination of the synchronous frame 101 is the server 4, specifies the frame control circuit 24Cn+1 corresponding to the destination server 4 to output a delay command. Such a method of specifying can be readily performed by preparing in advance a table that shows the correspondence between the destination addresses and the frame control circuits in the judgment circuit 23.

When the frame control circuit 24Cn+1 has input a delay command of the frame 101 from the judgment circuit 23, the FIFO circuit 26 of the frame control circuit 24Cn+1 performs a delay process that adds a specific time delay to the frame 101 as a synchronous frame. In other words, the specific time delay part 26a stores the frame 101 in the buffer memory at the specific time to add a specific time delay to the frame 101.

The frame control circuit 24Cn+1, after the received synchronous frame 101 has been stored, when the delay process has been completed by passing of the specific time, outputs the synchronous frame 101 on the cable 30Bn+1 Via the signal line 20Bn+1 and the port 21Pn+1 to allow it to arrive at the server 4.

In addition, when a plurality of clients 3C subsequently transmit a plurality of synchronous frames to the server 4, the frame control circuit 24Cn+1 repeats a delay process of a synchronous frame mentioned above for each synchronous frame to add a specific time delay to the plurality of synchronous frames equally. In other words, when transmitting synchronous frames from the clients and the server, a delay of the specific time can be added to synchronous frames equally in the middle of the transmission, this allows each transmission time of a plurality of synchronous frames transmitted from the clients and the server, which is a time period up to the time point at which each frame arrives at the destination, to be fixed equally.

Note that the appropriate length of the specific time of a synchronous frame to be delayed by the FIFO circuit 26, that is, the appropriate length of a specific delay time at which a synchronous frame is delayed by the specific time delay part 26a, varies depending on the transmission rate of ports used for transmission of the frame and the frame length. The appropriate length of the specific delay time, specifically, can be expressed as the following expression. Note that the delay time to be fixed may be a maximum delay time.

delay time={maximum frame length under frame standards+α}×{transmission time}

For example, when the frame length is 8,000 bytes (maximum frame length under frame standards+α) and the transmission time is 1 Gbps, the delay time is as follows.

{8,000 bytes×8 bits}/1 G=64 μS

Second Operation Example

When a General Frame and a Synchronous Frame Pass Through in this Order

Next, a second operation example of the transit time fixation device 2 according to this embodiment will be explained referring to a third time chart shown in FIG. 6. Note that in the second operation example, an operation sequence performed when the general frame 102 from the client 3C2 and the synchronous frame 101 from the client 3C1 are transmitted in this order on the cable 30A, to be input to the transit time fixation device 2, will be explained.

Figure 6:
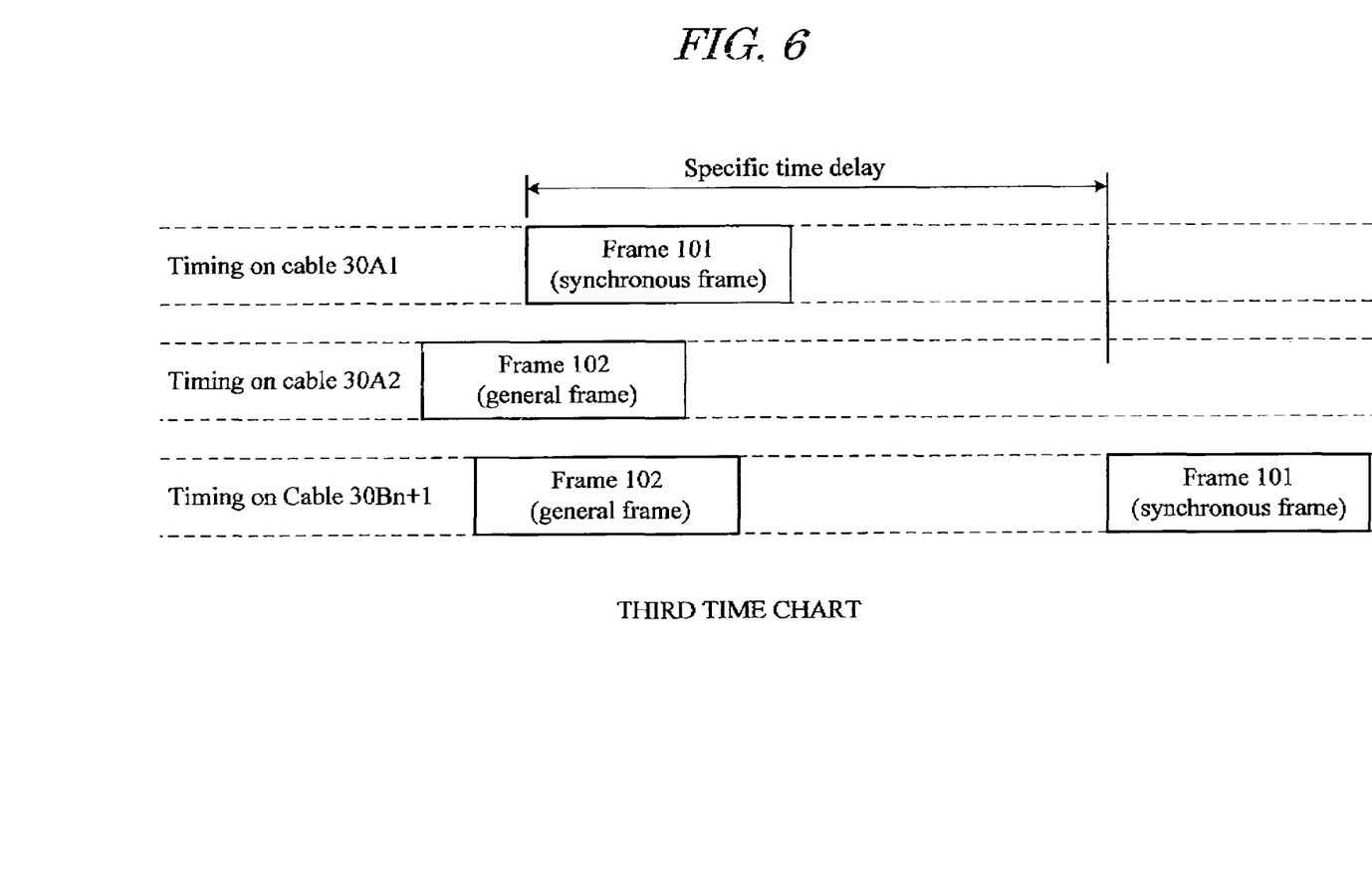
FIG. 6 is a view showing a third time chart of frame transmission timing on a cable according to an embodiment of this invention.

First, as shown in the third time chart of FIG. 6, the frame 102 from the client 3C2 is transmitted on the cable 30A2, to be input to the transit time fixation device 2 via the port 21P2. And then, the control circuit 25 in the judgment circuit 23 judges the frame type of the frame 102 transmitted from the client 3C2. In other words, the frame type judgment part 25a in the control circuit 25 judges as to whether the received frame 102 is a synchronous frame or a general frame other than synchronous frame.

As mentioned above, since the frame 102 is a general frame (the frame type is "1" in FIG. 4), the frame type judgment part 25a judges that the frame is not a synchronous frame. In addition, the destination judgment part 25b specifies the frame control circuit 24Cn+1 corresponding to the destination server 4 based on a destination address included in the frame 102. Here, since a judgment is made that the frame is a general frame other than synchronous frame, the frame type judgment part 25a does not output a delay command, but transmits a transit command of the frame 102 to the frame control circuit 24Cn+1 specified by the destination judgment part 25b.

Thus, the general frame 102, without delayed, simply passes through the frame control circuit 24Cn+1 specified by the destination judgment part 25b, and is output on the cable 30Bn+1 via the signal line 20Bn+1 and the port 21Pn+1, to arrive at the server 4. In other words, the general frame 102, to which no delay process is performed by the specific time delay part 26a in the FIFO circuit 26, simply passes through the FIFO circuit 26 to be output on the cable 30Bn+1.

On the other hand, as shown in the third time chart of FIG. 6, subsequently to the frame 102 from the client 3C2, the frame 101 from the client 3C1 is transmitted on the cable 30A1, to be input to the transit time fixation device 2 via the port 21P1. In the judgment circuit 23 in the transit time fixation device 2, the frame type judgment part 25a in the control circuit 25 judges the frame type of the frame from the client 3C1.

As mentioned above, since the frame 101 from the client 3C1 is a synchronous frame, the frame type judgment part 25a judges that the frame 101 is a synchronous frame. In addition, the destination judgment part 25b in the control circuit 25 specifies the frame control circuit 24Cn+1 corresponding to the destination server 4 based on a destination address included in the synchronous frame 101. Note that when the frame type judgment part 25a judges the synchronous frame 101 and the destination judgment part 25b specifies the frame control circuit 24Cn+1, the frame type judgment part 25*a* transmits a delay command of the frame 101 to the specified frame control circuit 24Cn+1.

As a result, in the frame control circuit 24Cn+1, the specific time delay part 26*a* in the FIFO circuit 26, adds a specific time delay to the synchronous frame 101 as shown in the third time chart of FIG. 6, and when a delay process has been completed, outputs the synchronous frame 101 on the cable 30Bn+1 to allows it to arrive at the server 4. As clearly shown in the third time chart of FIG. 6, when a general frame and a synchronous frame are passed through the transit time fixation device in this order, the general frame can be allowed to simply pass through, as a result, the general frame that has arrived earlier makes no influence on the delay time of the subsequent synchronous frame.

Third Operation Example

When a Synchronous Frame and a General Frame Pass Through in this Order

Next, a third operation example of the transit time fixation device 2 according to this embodiment will be explained referring to a forth time chart shown in FIG. 7. Note that in the third operation example, an operation sequence performed when the synchronous frame 101 from the client 3C1 and the general frame 102 from the client 302 are transmitted in this order on the cable 30A, to be input to the transit time fixation device 2, will be explained.

Figure 7:
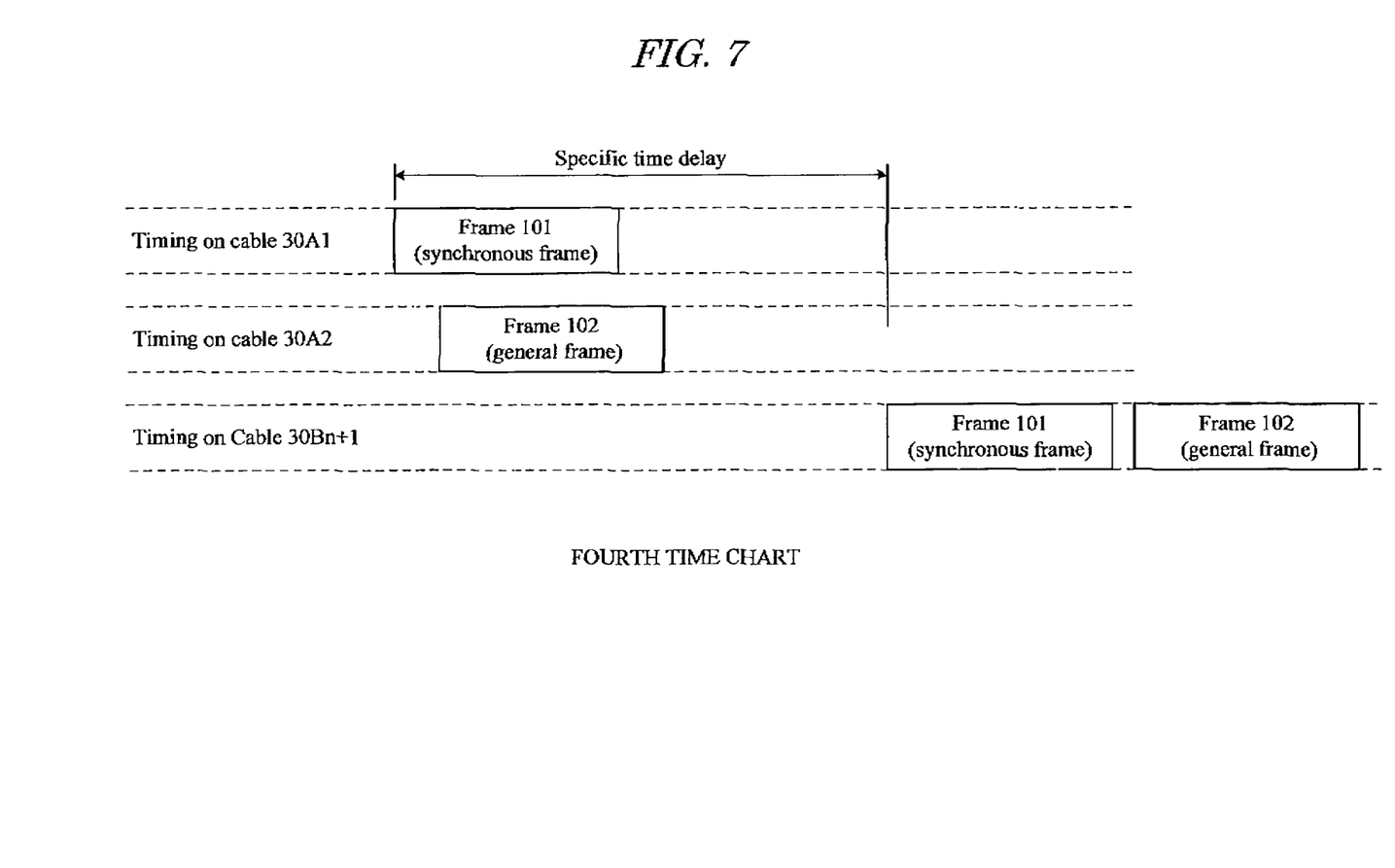
FIG. 7 is a view showing a fourth time chart of frame transmission timing on a cable according to an embodiment of this invention.

First, as shown in the fourth time chart of FIG. 7, the frame 101 from the client 301 is transmitted on the cable 30A1, to be input to the transit time fixation device 2 via the port 21P1. In this case, in the judgment circuit 23 in the transit time fixation device 2, the frame type judgment part 25*a* in the control circuit 25 judges that the frame type of the frame 101 from the client 3C1 is a synchronous frame.

In addition, the destination judgment part 25*b* in the control circuit 25 specifies the frame control circuit 24Cn+1 corresponding to the destination server 4 based on a destination address of the synchronous frame 101. And then, the frame type judgment part 25*a* transmits a delay command of the frame 101 to the specified frame control circuit 24Cn+1.

Next, as shown in the fourth time chart of FIG. 7, the frame 102 from the client 3C2 is transmitted on the cable 30A2, to be input to the transit time fixation device 2 via the port 21P1. In this case, in the judgment circuit 23 in the transit time fixation device 2, the frame type judgment part 25*a* in the control circuit 25 judges that the frame type of the frame 102 from the client 3C2 is a general frame.

In addition, the destination judgment part 25*b* in the control circuit 25 specifies the frame control circuit 24Cn+1 corresponding to the destination server 4 based on a destination address of the frame 102. And then, the frame type judgment part 25*a* transmits a transit command of the frame 102 to the specified frame control circuit 24Cn+1.

As mentioned above, when the general frame 102 from the client 3C2 is transmitted to the frame control circuit 24Cn+1 specified by the destination judgment part 25*b*, the delay frame judgment part 26*b* in the frame control circuit 24Cn+1 judged as to whether there is a frame to which a delay process is in progress in the frame control circuit 24Cn+1 depending on whether there is a frame stored in the FIFO buffer memory. As shown in the fourth time chart of FIG. 7, in this example, since the synchronous frame 101 transmitted from the former client 3C1 is in a delay process, the delay frame judgment part 26*b* judges that there is a frame to which a delay process is in progress.

As mentioned above, since the former synchronous frame 101 is in a delay process, the general frame delay part 26*c*, regardless of a transit command from the judgment circuit 23, as shown in FIG. 7, allows the general frame 102 from the client 3C2 to be delayed and wait for until that the delay process of the synchronous frame has been completed after passing of the specific time (delay and stand-by process). In other words, the frame 102 that passes through the frame control circuit 24Cn+1 has been stored in the FIFO buffer memory of the FIFO circuit 26 until the delay process of the former synchronous frame 101 is completed.

When the specific time delay process of the synchronous frame 101 from the client 3C1 has been completed in the FIFO circuit 26 in the frame control circuit 24Cn+1 and the synchronous frame 101 is output on the cable 30Bn+1 via the port 21Pn+1, the delay and stand-by process of the general frame 102 performed by the general frame delay part 26*c* also is completed, and the general frame 102 is output subsequently to the synchronous frame 101 on the cable 30Bn+1 via the port 21Pn+1. As a result the synchronous frame 101 and the general frame 102 successively arrived at the server 4 in this order.

ADVANTAGEOUS EFFECTS OF EMBODIMENT

With this embodiment, since it is possible to add a specific time delay to transmission of a synchronous frame, when the specific time is appropriately set depending on the transmission rate or the frame length, this allows each transmission time of a plurality of synchronous frames from a plurality of terminals, which is a time period up to the time point at which each frame arrives at the destination terminal, to be fixed equally. Consequently, when the network repeater makes a process of a plurality of frames from a plurality of terminals, the transmission delay time difference between the two ways does not occur among the plurality of synchronous frames, as a result, a high accuracy sampling synchronization control can be provided. In addition, this method does not require that the frame length is limited to a specific value or less, as a result, a large quantity of information can be transmitted.

Other Embodiments

Figure 8:
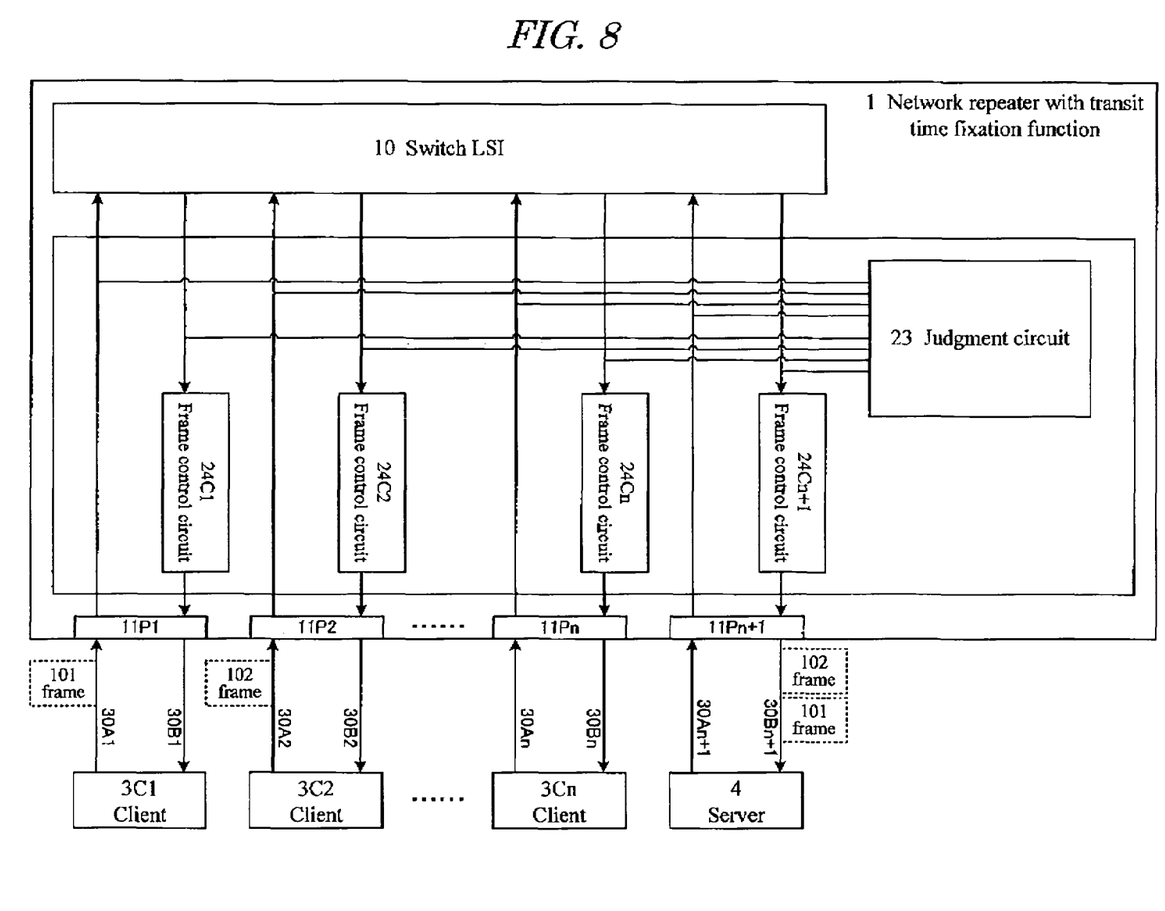
FIG. 8 is a block diagram showing an example of the entire configuration according to another embodiment of this invention.

Note that this invention is not limited to the embodiment as mentioned above, and includes various embodiments such as the following embodiment. This invention, as shown in FIG. 8, includes an embodiment in which the configuration of the judgment circuit 23 and the frame control circuit 24 of the transit time fixation device 2 is incorporated in the network repeater 1. This allows a high accuracy sampling synchronization control by a single network repeater 1 such as an Ethernet switch alone.

The invention claimed is:

1. A transit time fixation device which is used for protecting a power transmission line, comprising:
   a protective relay provided at each of a plurality to terminals of the power transmission line, based on information about electric current from each terminal, and which makes a sampling synchronization between the terminals via a network using a repeater to control transmission delay time between the terminals;
   a frame type judgment part which judges as to whether a frame is synchronous frame in the relation between a transmitter terminal and a destination terminal when the frame passes through the repeater, wherein the frame has been transmitted from each terminal and is composed of various information including information about electric current of the transmitter terminal; and a specific time delay part which performs a delay process of adding a specific time delay to transit time in which a synchronous frame judged by the frame type judgment part passes through the repeater, wherein the specific time is fixed in advance based on a maximum frame length under frame standards of the frame transmitted from each terminal and the transmission rate of the repeater, and further comprising:

a delay frame judgment part which judges as to whether there is a synchronous frame to which a delay process is in progress by the specific time delay part; and a general frame delay part which adds a delay to a general frame that has been judged not a synchronous frame by the frame type judgment part only when the delay frame judgment part has judged that there is a synchronous frame to which a delay process is in progress.

2. The transit time fixation device according to claim 1, further comprising:

a plurality of the specific time delay parts each of which is provided for each of the terminals.

3. The transit time fixation device according to claim 2, further comprising:

information about destination address, which is included in the frame, for identifying the transmitter terminal; and a destination judgment part which judges the destination terminal for each frame based on the information about destination address and identifies one of the specific time delay parts depending on the destination terminal.

4. The transit time fixation device according to claim 1, wherein:

the general frame delay part stores the general frame in a buffer until the delay process of the synchronous frame is completed, and transmits the general frame to the destination terminal when the delay process of the synchronous frame has been completed.

* * * * *